(12) United States Patent
Ramos et al.

(10) Patent No.: US 8,925,998 B2
(45) Date of Patent: Jan. 6, 2015

(54) VEHICLE ROOF FAIRING AND METHOD OF INSTALLING

(75) Inventors: Sandro Roberto Azevedo Ramos, High Point, NC (US); Srikanth Sundaresh Ghantae, Greensboro, NC (US); Michael Sorrells, Greensboro, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 0 days.

(21) Appl. No.: 14/007,511

(22) PCT Filed: Mar. 28, 2011

(86) PCT No.: PCT/US2011/030191
§ 371 (c)(1),
(2), (4) Date: Dec. 9, 2013

(87) PCT Pub. No.: WO2012/134439
PCT Pub. Date: Oct. 4, 2012

(65) Prior Publication Data
US 2014/0084625 A1    Mar. 27, 2014

(51) Int. Cl.
*B60J 9/00*       (2006.01)
*B60J 1/02*       (2006.01)
*B62D 35/00*      (2006.01)

(52) U.S. Cl.
CPC *B60J 1/02* (2013.01); *B62D 35/001* (2013.01)
USPC ..................................................... 296/180.2

(58) Field of Classification Search
CPC .. B62D 35/001; B62D 35/008; B62D 35/007; B62D 35/02; B62D 33/0612; B62D 35/004; B64C 7/00
USPC ..................... 296/180.2, 180.1, 180.4, 181.5
See application file for complete search history.

(56) References Cited

U.S. PATENT DOCUMENTS 2,722,034 A       11/1955    May
3,514,023 A  *    5/1970     Brooks et al. ................. 224/316

(Continued)

OTHER PUBLICATIONS

International Search Report and Written Opinion of corresponding PCT/US2011/030191.

*Primary Examiner* — Kiran B Patel
(74) *Attorney, Agent, or Firm* — Michael Pruden; Martin Farrell

(57) ABSTRACT

The present invention relates to a roof fairing body and a method of installing a roof fairing on a vehicle. The roof fairing includes a lower fairing body section, an upper fairing body section, a shipping configuration, and an operable configuration. The lower fairing body section includes a front wall and side walls extending rearward from opposite ends of the front wall. The front wall and side walls cooperate to define an upper roof fairing section receiving space. The upper fairing body section is configured to mate with the lower fairing body section to form at least one hinge. When in the shipping configuration, the upper roof fairing section is positioned at least partially within the upper roof fairing section receiving space of the lower fairing body section, whereby the roof fairing body is provided with a shipping height and the upper roof fairing section and the lower fairing body section mate to form at least one hinge. When in an operable configuration the upper roof fairing section pivots about the at least one hinge whereby the upper roof fairing section is situated at least partially above the lower fairing body section and the roof fairing body is provided with an operable height that is greater than the shipping height.

10 Claims, 10 Drawing Sheets

(56) References Cited

U.S. PATENT DOCUMENTS

| | | | | |
|---|---|---|---|---|
| 4,082,340 A * | 4/1978 | Taylor | | 296/180.3 |
| 4,082,341 A * | 4/1978 | Gore | | 296/180.2 |
| 4,141,580 A * | 2/1979 | Ivan | | 296/180.2 |
| 4,156,543 A * | 5/1979 | Taylor et al. | | 296/180.3 |
| 4,379,583 A * | 4/1983 | Taylor et al. | | 296/180.3 |
| 4,458,937 A * | 7/1984 | Beckmann et al. | | 296/180.3 |
| 4,462,628 A * | 7/1984 | Gregg | | 296/180.3 |
| 4,470,628 A * | 9/1984 | Husted | | 296/180.3 |
| 4,509,786 A * | 4/1985 | Gregg | | 296/180.3 |
| 4,784,424 A * | 11/1988 | Wiley, Jr. | | 296/180.2 |
| 4,883,307 A * | 11/1989 | Hacker et al. | | 296/180.2 |
| 4,919,472 A * | 4/1990 | Wiley, Jr. | | 296/180.2 |
| 5,174,626 A * | 12/1992 | Wiley et al. | | 296/180.1 |
| 5,249,837 A * | 10/1993 | Luttrell | | 296/180.3 |
| 5,513,894 A * | 5/1996 | Ragsdale | | 296/180.2 |
| 5,595,419 A * | 1/1997 | Spears | | 296/180.2 |
| 5,603,549 A * | 2/1997 | Chen et al. | | 296/180.1 |
| D385,223 S * | 10/1997 | Marlowe et al. | | D12/96 |
| 5,755,485 A * | 5/1998 | Christie et al. | | 296/180.1 |
| 6,217,107 B1 | 4/2001 | Langlois | | |
| 7,121,614 B2 * | 10/2006 | Kawai | | 296/180.2 |
| D633,015 S * | 2/2011 | Peltola et al. | | D12/181 |
| 2008/0244907 A1* | 10/2008 | Boucher | | 29/897.2 |
| 2012/0247718 A1* | 10/2012 | Lawrence et al. | | 165/44 |

\* cited by examiner

VEHICLE ROOF FAIRING AND METHOD OF INSTALLING

FIELD OF THE INVENTION

The present invention relates to vehicle roof fairings.

BACKGROUND OF THE INVENTION

Roof fairings are employed on a variety of land vehicles, particularly truck tractors, for purposes of reducing drag. While efficient at reducing drag, the height of roof fairings are often a concern during what is known as "piggy back" shipping of truck tractors from the factory.

As shown in FIG. 1, during piggy back shipping a towing truck tractor 5 may tow two truck tractors 5" and 5'", which are secured to respective fifth wheels 6' and 6." While piggy backing may be efficient for truck delivery, as shown in FIG. 1, the stacking of the truck tractors 5" and 5'" may cause roof fairings 10" and 10'" to extend above a height limit L, such as, for example, a bridge height limit.

Numerous two-piece roof fairing arrangements have been devised to overcome this problem, U.S. Pat. No. 4,919,472 to Wiley, Jr, U.S. Pat. No. 5,174,026 to Wiley, Jr. et al. and U.S. Pat. No. 5,755,485 to Christie et al. show two piece roof fairing arrangements connected by hinges that allow the height of the roof fairing to be lowered during shipment and then extended after delivery. During shipping, these arrangements permit an upper fairing body section to fit within a lower fairing body section that is mounted to the cab roof, whereby the overall height of the roof fairing is decreased. Advantageously, after delivery, the hinges in these arrangements allow the upper fairing, body section to easily move into an extended operable position, whereby the height of the roof faring is extended.

While such designs allow the height of roof fairings to be decreased during piggy back shipping, the permanent coupling via the hinges make for difficult, time consuming, and awkward factory manufacturing and installation. For example, due to the awkward shape, flexibility of the fairing walls, and combined weight of the hingedly connected upper and lower body sections, at least two workers would be are required to handle and mount the roof fairings in a factor setting. By way of another example, the use of piano hinges increases the manufacturing cost and assembly time. By way of yet another example, the use of a living hinge requires that the two fairing pieces be molded simultaneously with in a relatively large common mold.

The present invention is directed to an improved vehicle roof fairing.

SUMMARY OF THE INVENTION

According to one aspect of the present invention, a roof failing body comprises a lower fairing body section, an upper fairing body section, a shipping configuration, and an operable configuration. The lower fairing body section includes a front wall and side walls extending rearward from opposite ends of the front wall. The front wall and side walls cooperate to define an upper roof fairing section receiving space. The upper fairing body section is configured to mate with the lower fairing body section to form at least one hinge. When in the shipping configuration, the upper roof fairing section is positioned at least partially within the upper roof fairing section receiving, space of the lower fairing body section, whereby the roof fairing body is provided with a shipping height and the upper roof fairing section and the lower fairing body section mate to form at least one hinge. When in an operable configuration the upper roof fairing section pivots about the at least one hinge whereby the upper roof fairing section is situated at least partially above the lower fairing body section and the roof fairing body is provided with an operable height that is greater than the shipping height.

According to another aspect of the present invention, a method for installing a roof fairing on a vehicle comprises the steps of providing a root fairing body that includes a lower fairing body section and an upper fairing body section, wherein the lower fairing body section includes a front wall and side was extending rearward from opposite ends of the front wall, the front wall and side walls cooperate to define an upper roof fairing section receiving space, and the upper fairing body section is configured to mate with the lower fairing body section to form at least one hinge, installing the roof fairing on a vehicle in a shipping configuration whereat the lower fairing body section is secured to the roof then the upper roof fairing section is positioned at least partially within the upper roof fairing section receiving space of the lower fairing body section, whereby the roof fairing body is provided with h a shipping height and the upper roof fairing section and the lower fairing body section mate to form at least one hinge, and installing the roof fairing on a vehicle in an operable configuration whereat the upper roof fairing section pivots about the at least one hinge whereby the upper roof fairing section is situated at least partially above the lower fairing body section and the roof fairing body is provided with an operable height that is greater than the shipping height.

DETAILED DESCRIPTION OF THE INVENTION

FIGS. 2-10, depict a roof fairing 10 according to one embodiment of the present invention. As shown therein, the roof fairing 10 is provided with a roof fairing body 15 that includes a lower fairing body section 30 and an upper fairing body section 50.

Figure 4:
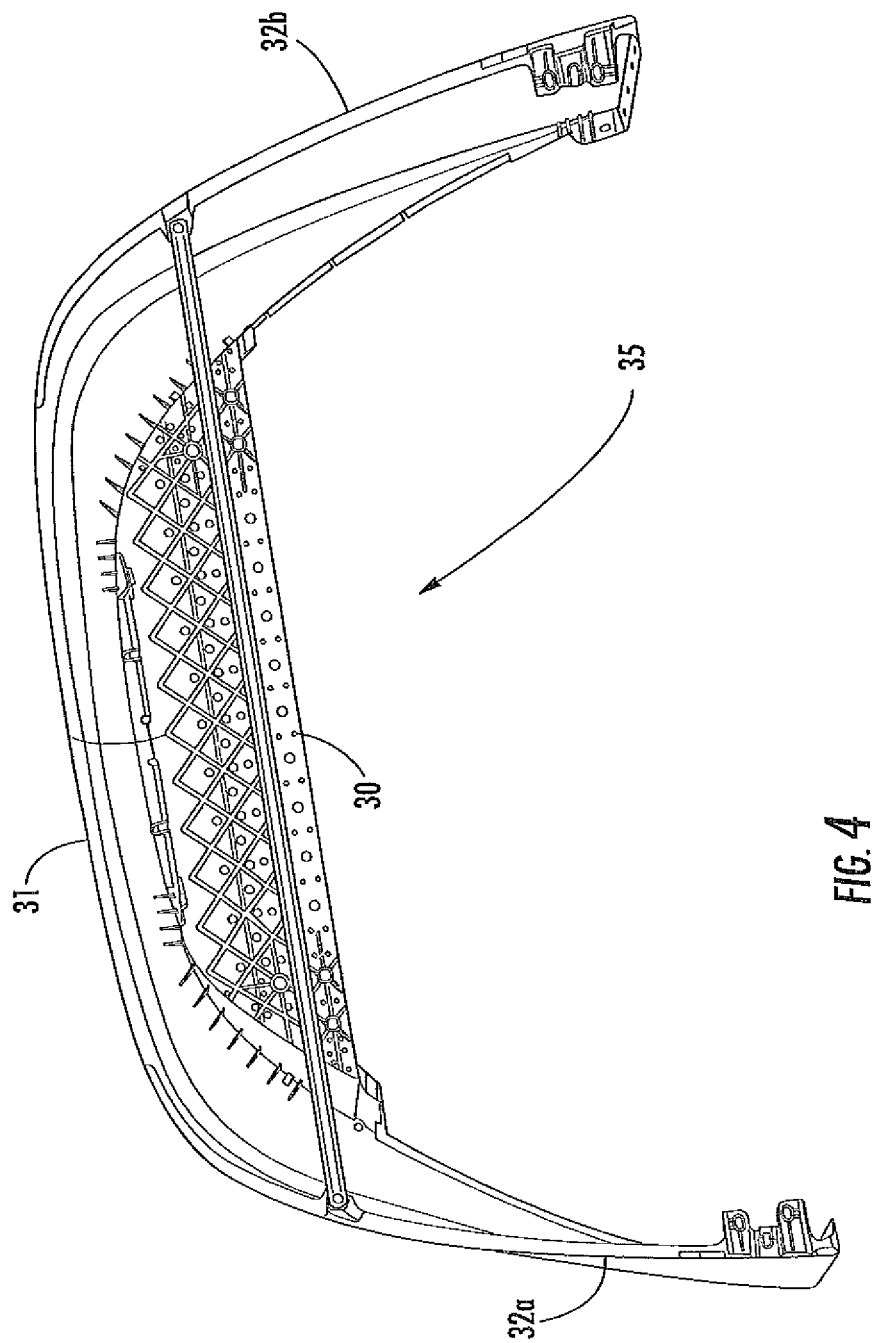
FIG. 4 shows an underside view of a lower fairing body section according to one embodiment.

Turning now to FIG. 4, an underside view of the lower fairing body section 30 is depicted. As shown therein, the lower fairing body section 30 is provided with a front wall 31 and side walls 32a, 32b that extend rearward from opposite ends of the front wall 31. As shown, the front wall 31 and side wails 32a, 32b cooperate to define an upper roof fairing section receiving space 35 located between the front wall 31 and the side walls 32a, 32b.

Figure 1:
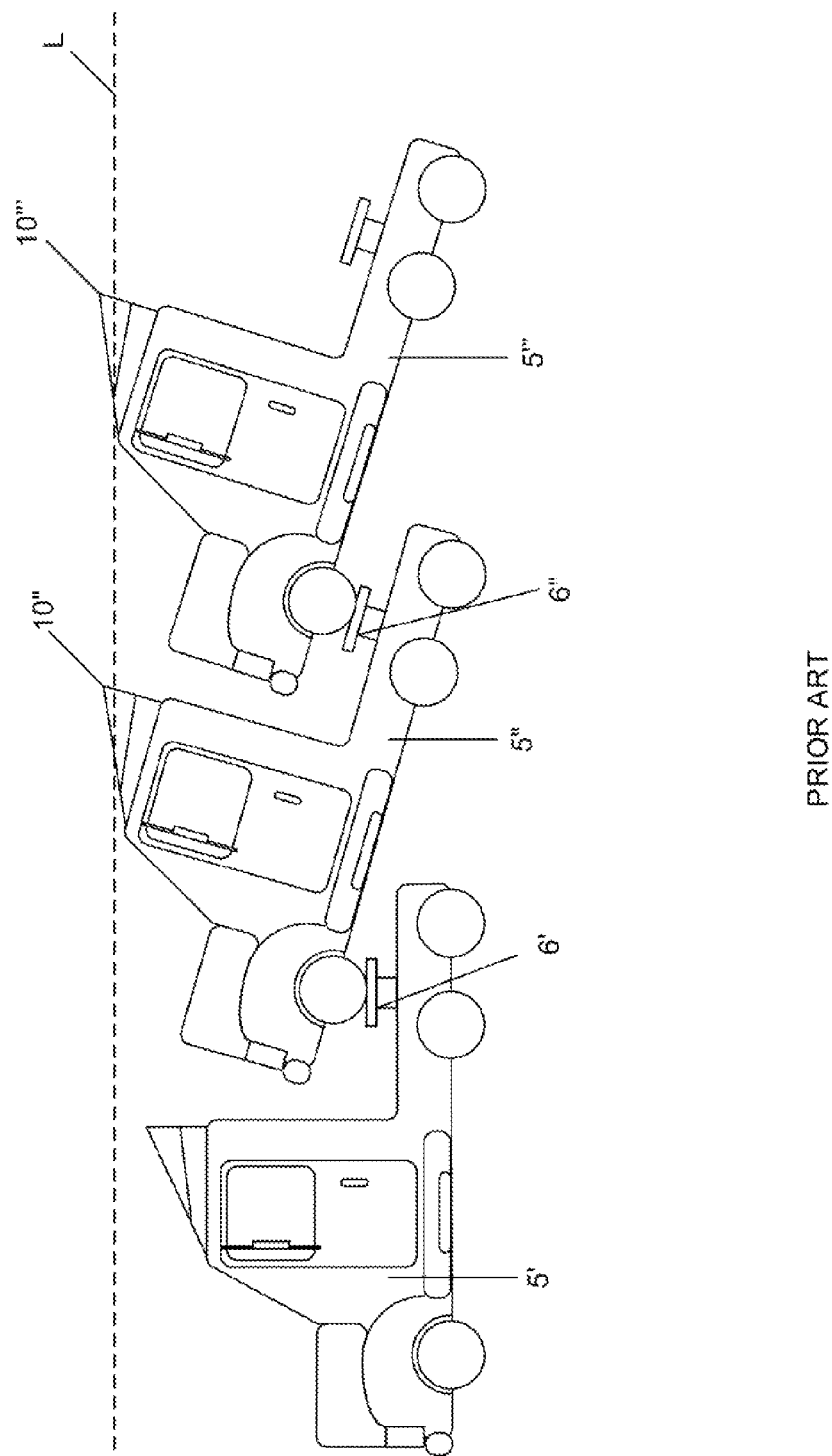
FIG. 1 illustrates a plurality of prior art truck tractors during piggy back shipping.
Figure 2:
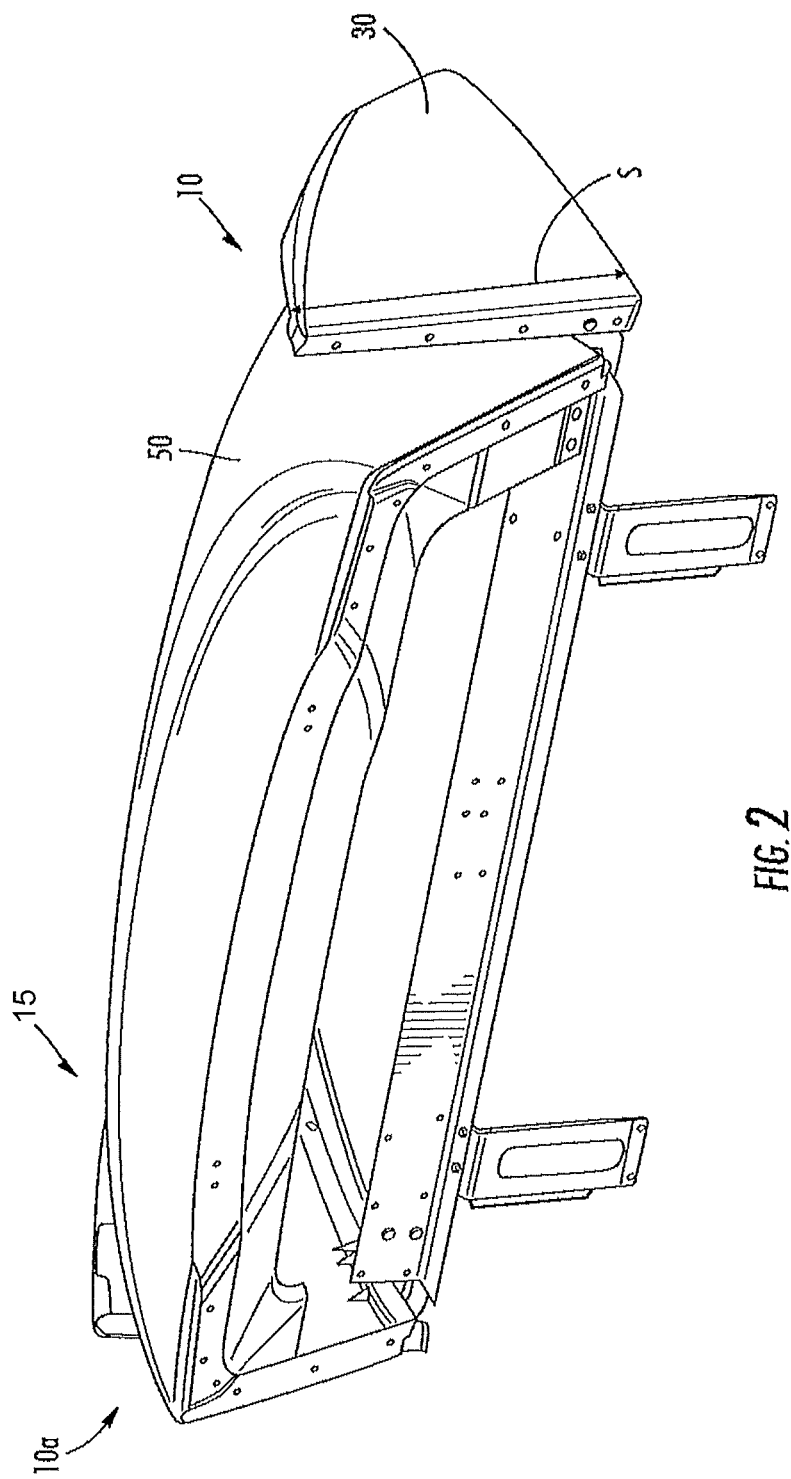
FIG. 2 shows a roof fairing according to one embodiment in a shipping configuration.
Figure 3:
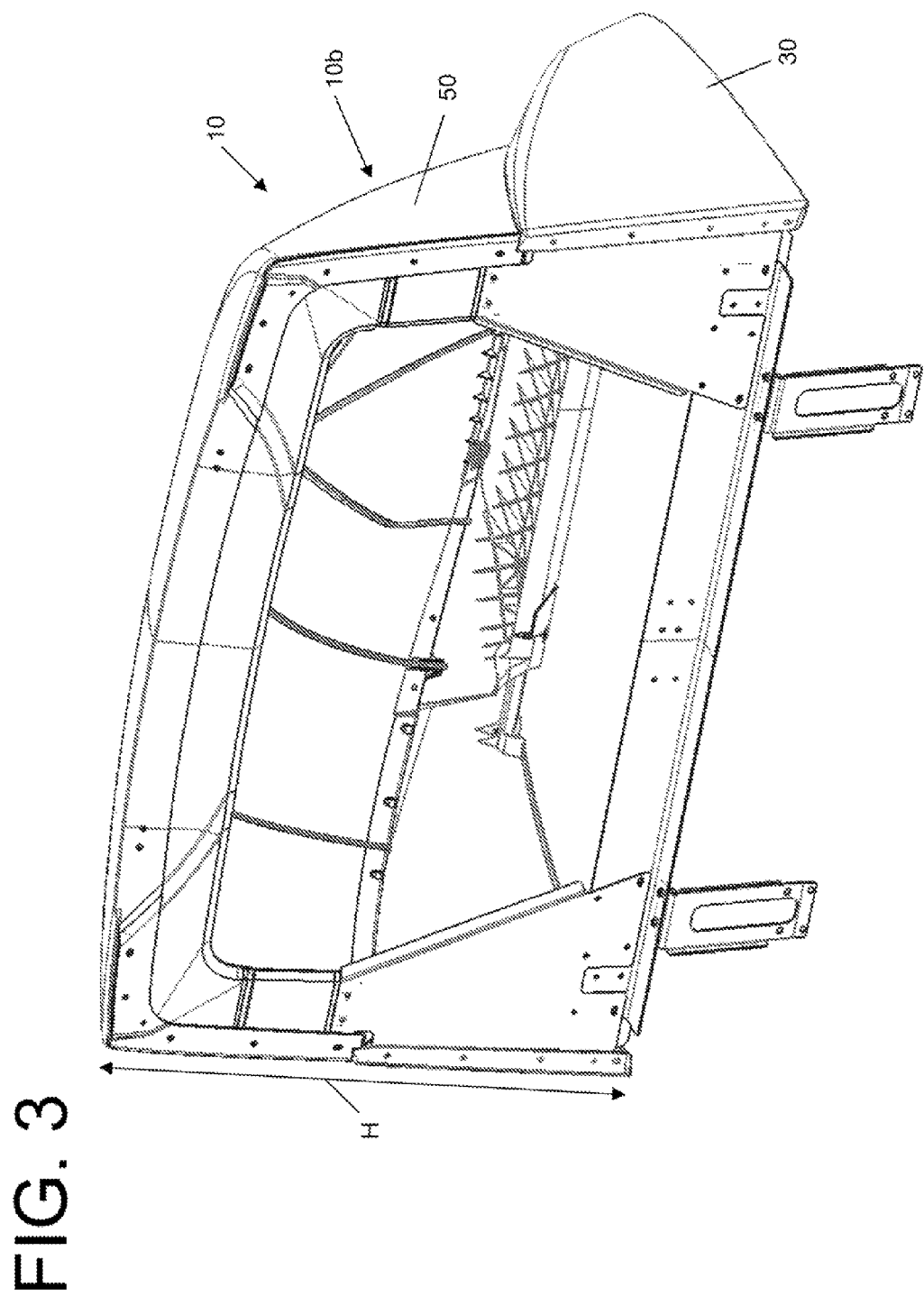
FIG. 3 shows a roof fairing according to one embodiment in an operable configuration.

According to another aspect of the present embodiment, the roof fairing body 15 10 is provided with a shipping configuration 10a and an operable configuration 10b. As shown in FIG. 2, when in the shipping configuration 10a, the upper roof fairing section 50 is situated at least partially within the upper roof fairing section receiving space 35 defined by the lower fairing body section 30 and the roof fairing body 15 10 is provided with a shipping height S. As shown in FIG. 3, when in the operable configuration 10b, the roof fairing body 15 10 is provided with an operable height H that is greater than the shipping height and the upper roof fairing section 50 is situated at least partially above the lower fairing body section 30.

According to another aspect of the present embodiment, the upper roof fairing body section 50 is configured to mate with the lower fairing body 30 section to form a hinge 70. According to another aspect of the present embodiment, the upper roof fairing body section 50 is configured to mate with the lower fairing body section 30 section to form a hinge 70 when the upper roof fairing section 50 is positioned at least partially within the upper roof fairing section receiving space 35 of the lower fairing body section 30.

Figure 5:
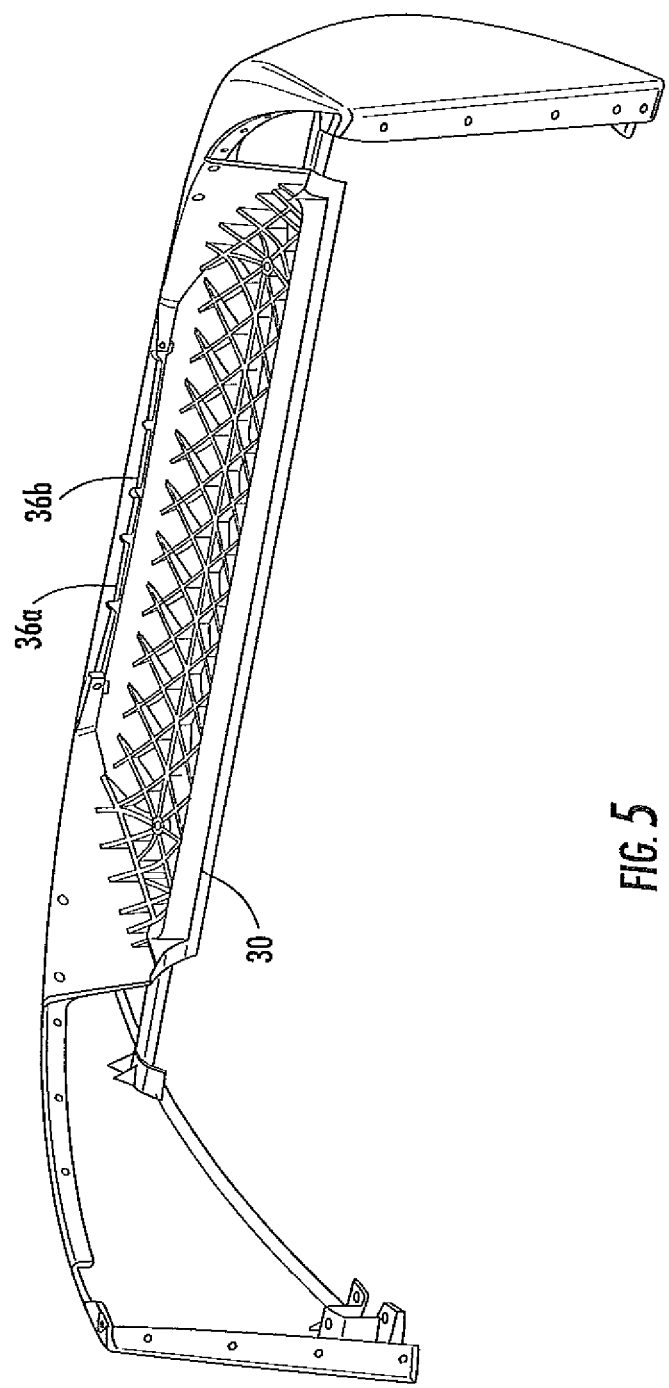
FIG. 5 shows a rear view of a lower fairing body section according to one embodiment.
Figure 6:
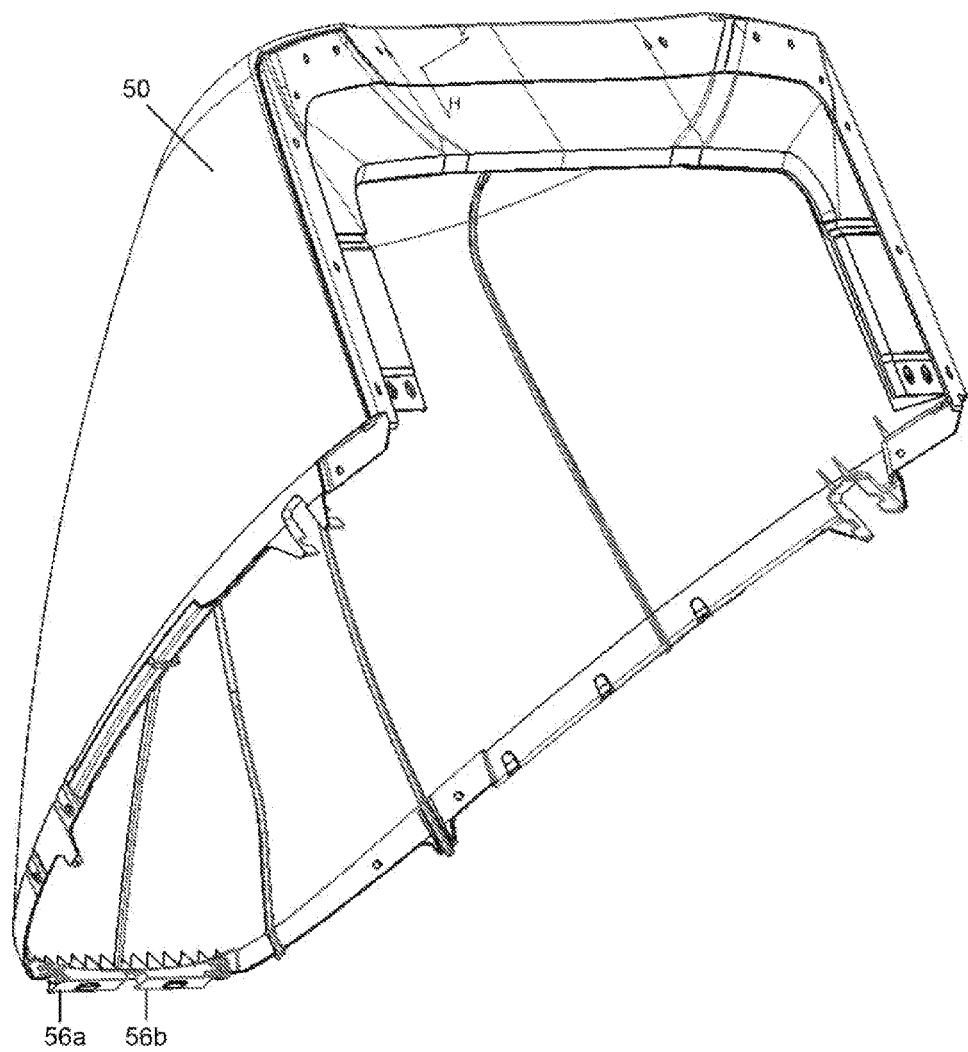
FIG. 6 shows a rear underside view of an upper fairing body section according to one embodiment.
Figure 7:
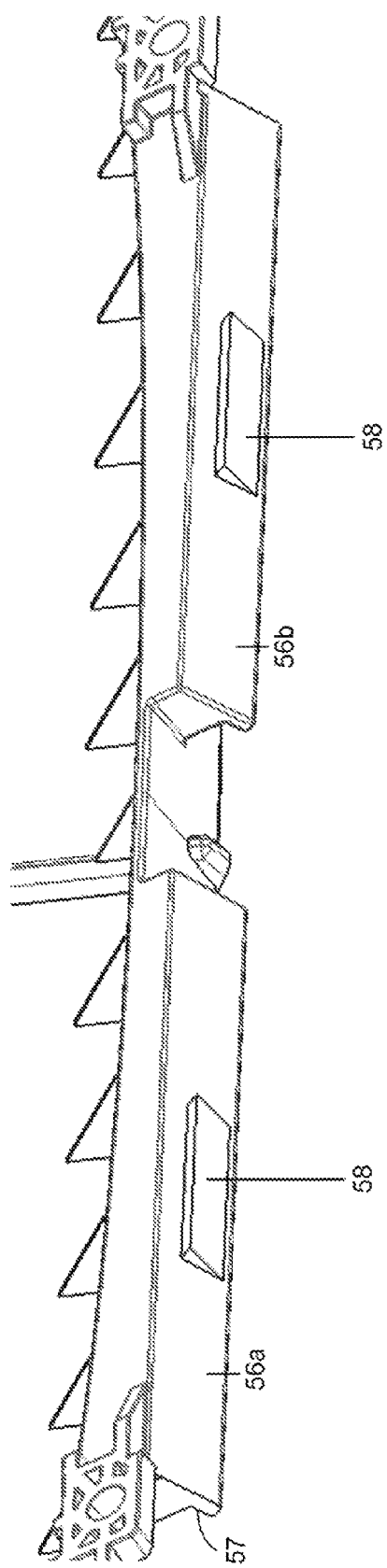
FIG. 7 shows a close up view of a pair of tongues on an upper fairing body section according to one embodiment.

Turning now FIG. 5, in the present embodiment, the front wall 31 of the lower fairing body section 30 may be define at least one cutout, as at 36a, 36b. Turning now to FIGS. 6 and 7, a front wall 51 of the upper fairing body section 50 may be provided with at least one tongue, as at 56a, 56b.

Figure 8:
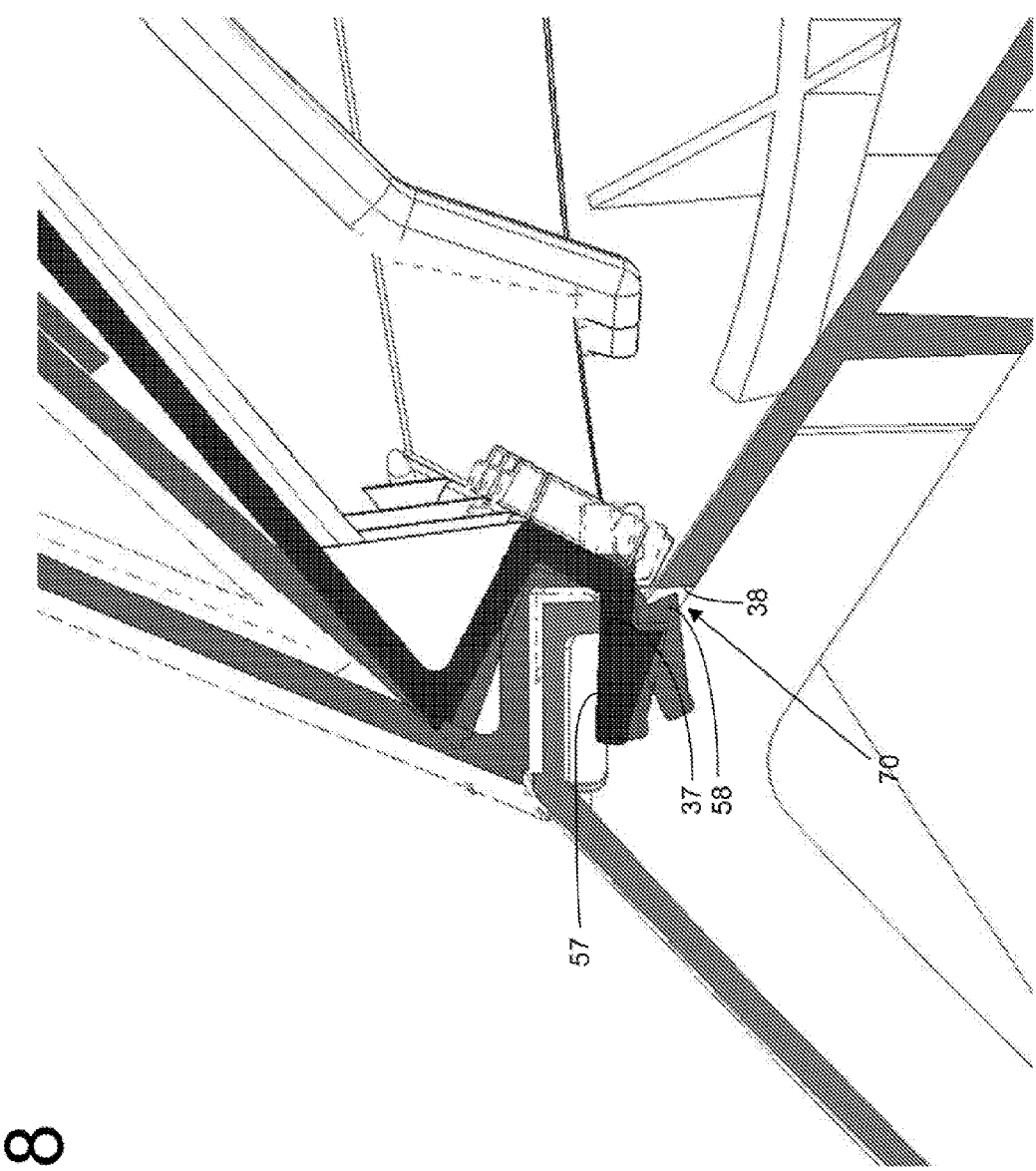
FIG. 8 shows a close up progression view of a joint between the upper and lower body sections during a transition from a shipping configuration to an operable configuration.
Figure 9:
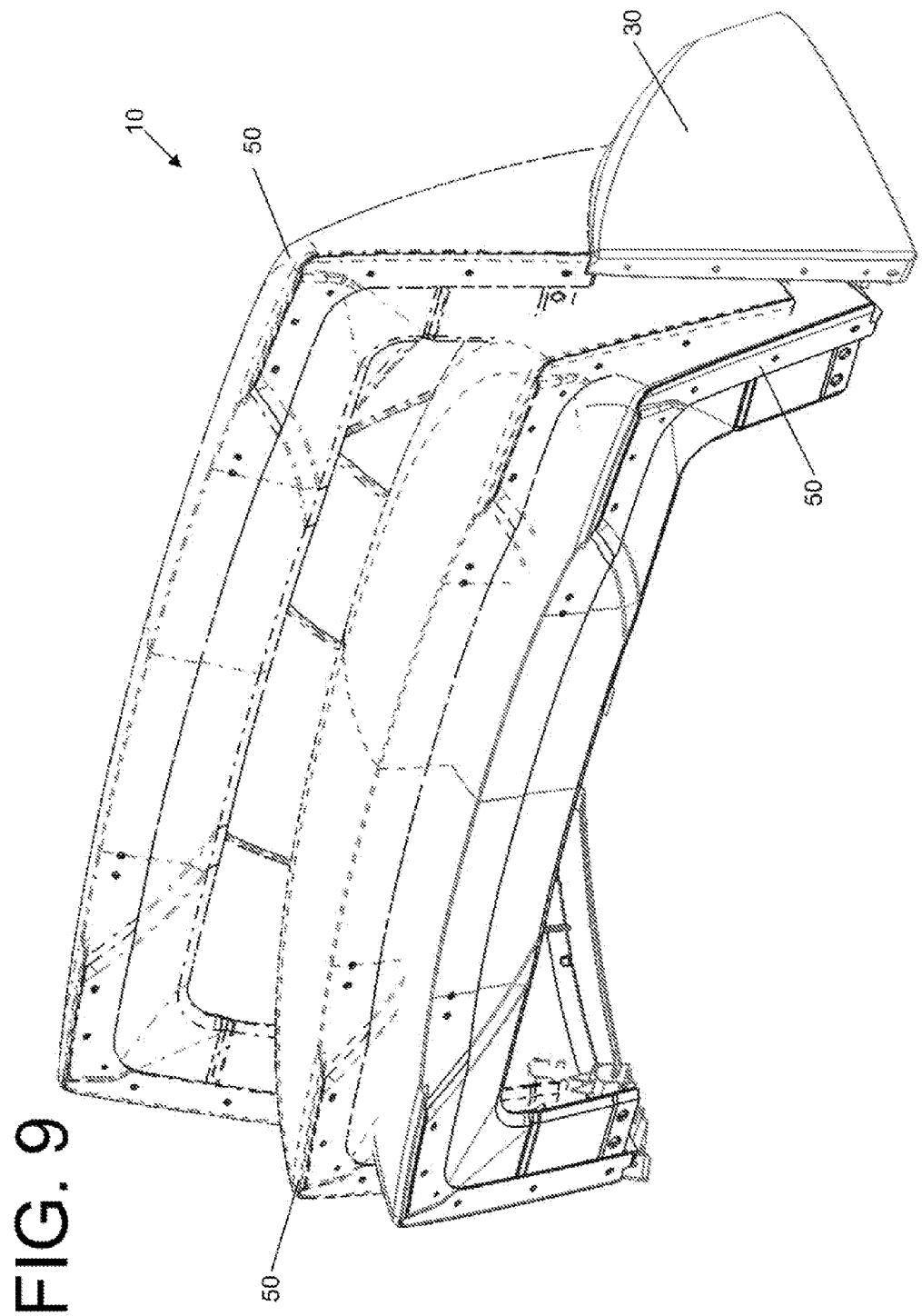
FIG. 9 shows a rear perspective view of the upper and lower body sections during a transition from a shipping configuration to an operable configuration.
Figure 10:
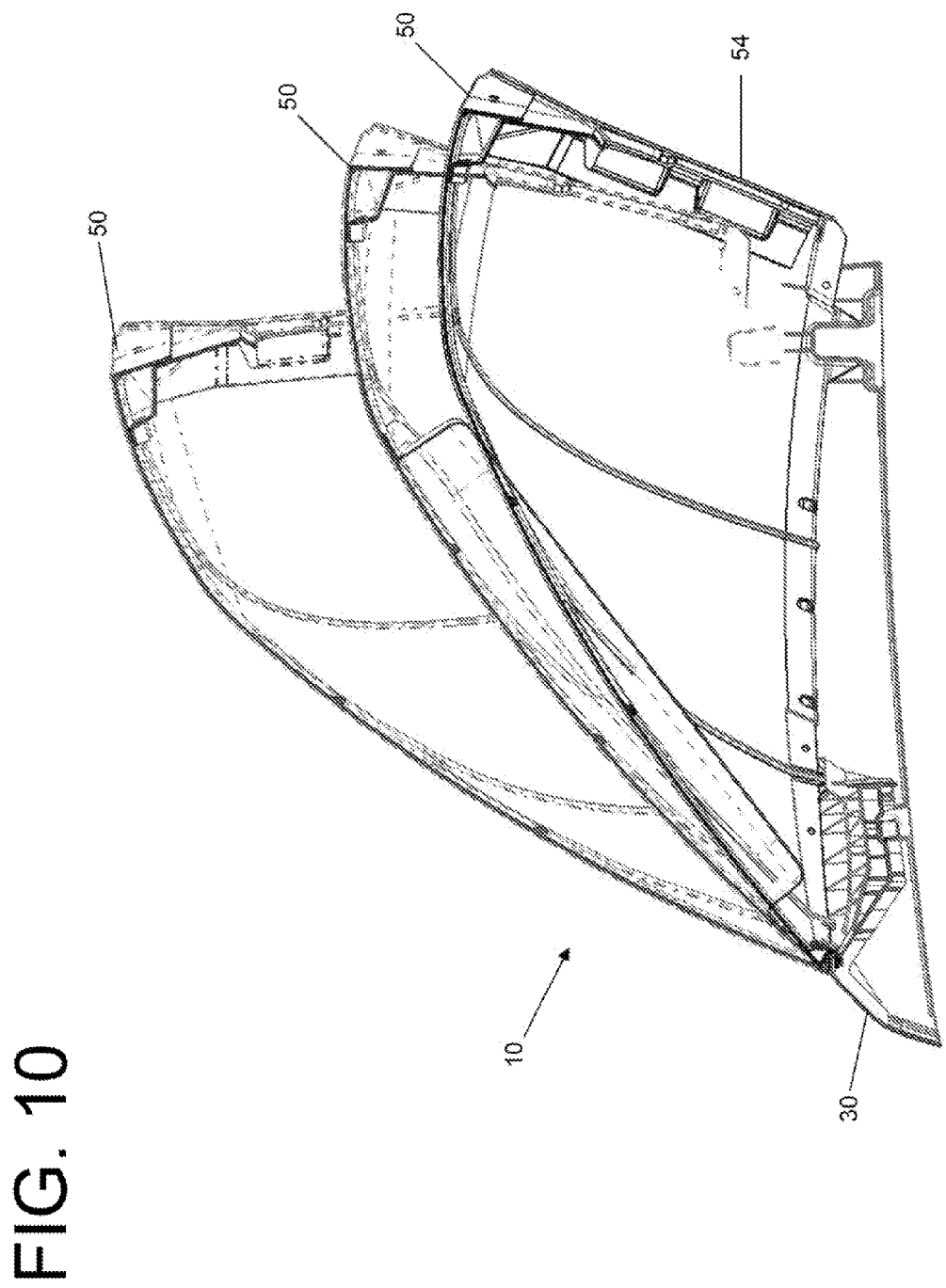
FIG. 10 shows a side sectional view of the upper and lower body sections during a transition from a shipping configuration to an operable configuration.

Turning now to FIG. 8, when the roof fairing 10 is in a shipping configuration, as the upper roof fairing section 50 is fitted within the upper roof fairing section receiving space 35, the tongues 56a, 56b mate with respective cutouts 36a, 36b to form a pair of hinges 70, which are preferably releasable in nature. As shown by the progressions in FIGS. 8-10, during a transition from the shipping position 10a to the operable position 10b, the upper roof fairing section 50 pivots about the hinges 70 whereby the upper roof fairing section 50 is situated at least partially above the lower fairing body section 30 and the fairing body 10 is provided with the operable height H that is greater than the shipping height S.

Advantageously, as shown in FIG. 8, when in the shipping configuration 10a, upper surface 57 of the tongues 56a, 56b may engage the an upper cutout defining surface 37 of the cutouts 36a, 36b to partially secure the front wall 51 of the upper fairing body section 50 to the lower fairing body section 30. Advantageously, when in the operable configuration 10b, as shown in FIG. 8, the barb 58 on the underside of the tongues 56a, 56b may engage a lower cutout defining surface 38 of the cutouts 36a, 36b to Limit the amount of rotation of the upper roof fairing section 50 during a transition from the shipping configuration 10a to the operable configuration 10b.

Advantageously, the present embodiment allows for the upper and lower fairing body sections 30, 50 to be handled and installed separately prior to shipping. Prior to shipment, the lower fairing body section 30 may be handled and installed on the roof 7 of the cab of a truck. Those of ordinary skill in the art will appreciate that the lower fairing body section 30 may be secured to the roof 7 in any appropriate manner, inc tiding for example by use of brackets, struts, or threaded fasteners.

Thereafter, the upper fairing body section 50 may be handled and inserted into the upper fairing body section receiving space 35 of the lower fairing body section 30 so that the tongues 56a, 36b mate with the cutouts 36a, 36b to secure the front wall 51 of the upper fairing, body section 50 to the lower fairing body section 30 and the roof 7. Those of ordinary skill in the art will appreciate that that the rear 54 of the upper fairing, body section 50 may be secured to the roof 7 or the lower fairing body section 30 in any appropriate manner, including, for example, via use of brackets, struts, or threaded fasteners.

Advantageously, after shipping, the present embodiment avows for the upper fairing body section 50 to pivot about hinges 70 to provide the operable configuration. By way of example, the rear 54 of the upper fairing body section 50 can be unsecured from the roof 7 or the lower fairing body section 30, whereby a lifting force applied to the rear 54 will cause the upper fairing, body section 50 to pivot about the hinge 70 to provide the operable configuration 10b whereat the upper fairing body section 50 may be fully secured to the lower fairing body section 30 in any appropriate manner, including, via use of brackets, struts, or threaded fasteners.

The detailed descriptions of the above embodiments are not exhaustive descriptions of all embodiments contemplated by the inventors to be within the scope of the invention. The present description depicts specific examples to teach those skilled in the art how to make and use the best mode of the invention. Those skilled in the art will appreciate variations from these examples that fall within the scope of the invention. By way of example, and not limitation, although the present embodiment depicts at least one joint 70 formed by tongue 56a or 56b and cutout 36a or 36b, those of ordinary skill in the art will appreciate that numerous other types of hinges may be formed by mating the of the lower and upper fairing body sections. By way of example, and not limitation, in alternative embodiments, a lower fairing body section may include a pair of pins (not shown) that extend toward each other from the opposing side walls and the upper fairing body section may include cylindrical receiving surfaces (not shown) that receive the pins, whereby the upper fairing, body section is pivotable about the pins.

Persons skilled in the art will recognize that certain elements of the above-described embodiments and examples may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Those of ordinary skill in the art will also appreciate that some conventional aspects have been simplified or omitted. Thus, although specific embodiments of, and examples for, the invention are described herein for illustrative purposes, various equivalent modifications are possible within the scope of the invention, as those skilled in the relevant art will recognize. Accordingly, the scope of the invention is determined from the appended claims and equivalents thereof.

We claim:

1. A roof fairing for a vehicle, comprising:
a roof fairing body provided with:
   a lower fairing body section including:
      the lower fairing body section includes a front wall and side walls extending rearward from opposite ends of the front wall;
      the front wall and side walls cooperate to define an upper fairing body section receiving space;
   an upper fairing body section configured to mate with the lower fairing body section to form at least one hinge;

a shipping configuration whereat the upper fairing body section is positioned at least partially within the upper fairing body section receiving space of the lower fairing body section, so that:

the roof fairing body is provided with a shipping height;

the upper fairing body section and the lower fairing body section mate to form the at least one hinge; and an operable configuration, whereat the roof fairing body transitions from the shipping configuration to the operable configuration via pivoting the upper fairing body section about the at least one hinge so that the roof fairing body is provided with an operable height that is greater than the shipping height.

2. The roof fairing for a vehicle according to claim 1, wherein the at least one hinge is a releasable hinge.

3. The roof fairing for a vehicle according to claim 1, wherein:

the lower fairing body section includes at least one cutout;
the upper fairing body section includes at least one tongue; and
the at least one tongue and the at least one cutout mate to provide the at least one hinge.

4. The roof fairing for a vehicle according to claim 3, wherein when the roof fairing is in the shipping configuration an upper surface of the at least one tongue engages an upper cutout defining surface of the at least one cutout to partially secure a front wall of the upper fairing body section to the lower fairing body section.

5. The roof fairing for a vehicle according to claim 3, wherein when the roof fairing is in the operable configuration a barb on an underside of the at least one tongue engages a lower cutout defining surface on the at least one cutout to limit the amount of rotation of the upper fairing body section.

6. A method for installing a roof fairing on a vehicle, comprising the steps of:

providing a roof fairing body that includes a lower fairing body section and an upper fairing body section including:

the lower fairing body section includes a front wall and side walls extending rearward from opposite ends of the front wall;

the front wall and side walls cooperate to define an upper fairing body section receiving space;

the upper fairing body section is configured to mate with the lower fairing body section to form the at least one hinge;

installing the roof fairing on a vehicle in a shipping configuration whereat:

the lower fairing body section is secured to the roof then the upper fairing body section is positioned at least partially within the upper fairing body section receiving space of the lower fairing body section, so that:

the roof fairing body is provided with a shipping height;

the upper fairing body section and the lower fairing body section mate to form at least one hinge; and installing the roof fairing on a vehicle in an operable configuration, whereat the roof fairing body transitions from the shipping configuration to the operable configuration via pivoting the upper fairing body section about the at least one hinge so that the roof fairing body is provided with an operable height that is greater than the shipping height.

7. The method for installing a roof fairing on a vehicle according to claim 6, wherein the at least one hinge is a releasable hinge.

8. The method for installing a roof fairing on a vehicle according to claim 6, wherein:

the lower fairing body section includes at least one cutout;
the upper fairing body section includes at least one tongue; and
the at least one tongue and the at least one cutout mate to provide the at least one hinge.

9. The method for installing a roof fairing on a vehicle according to claim 8, further comprising the step of positioning an upper surface of the at least one tongue in engagement with an upper cutout defining surface of the at least one cutout wherein when the roof fairing is in the shipping configuration to partially secure a front wall of the upper fairing body section to the lower fairing body section.

10. The method for installing a roof fairing on a vehicle according to claim 8, further comprising the step of positioning a barb on an underside of the at least one tongue into engagement with a lower cutout defining surface on the at least one cutout to limit the amount of rotation of the upper fairing body section when the roof fairing is in the operable configuration.

* * * * *